Figure 1:
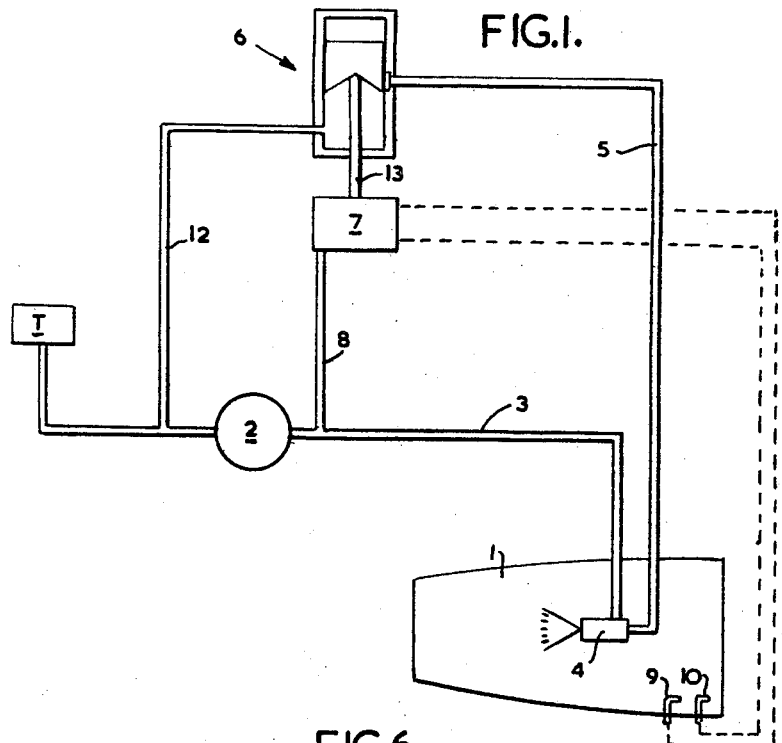

Jan. 5, 1965 S. R. TYLER 3,164,161
CONTROLS FOR GAS TURBINE ENGINES OR OTHER APPARATUS
Filed March 26, 1962 5 Sheets-Sheet 1

INVENTOR
STANLEY R. TYLER
By Reynolds + Christensen
ATTY's.

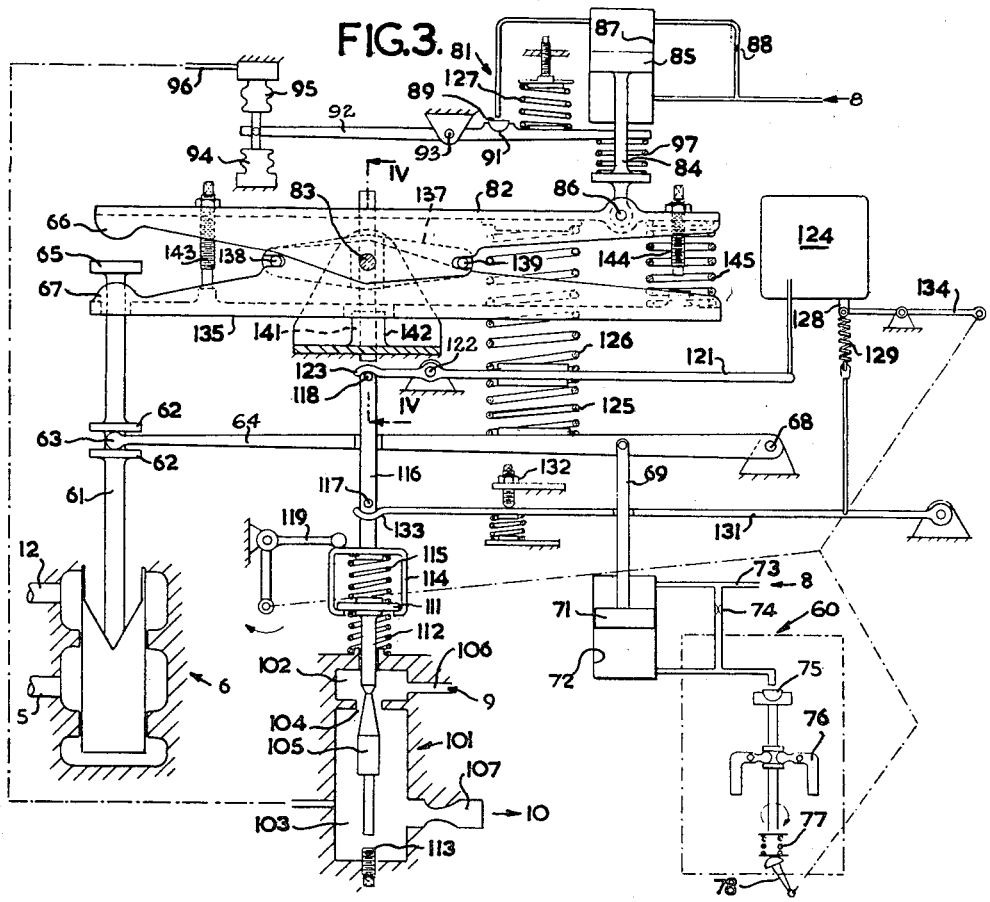

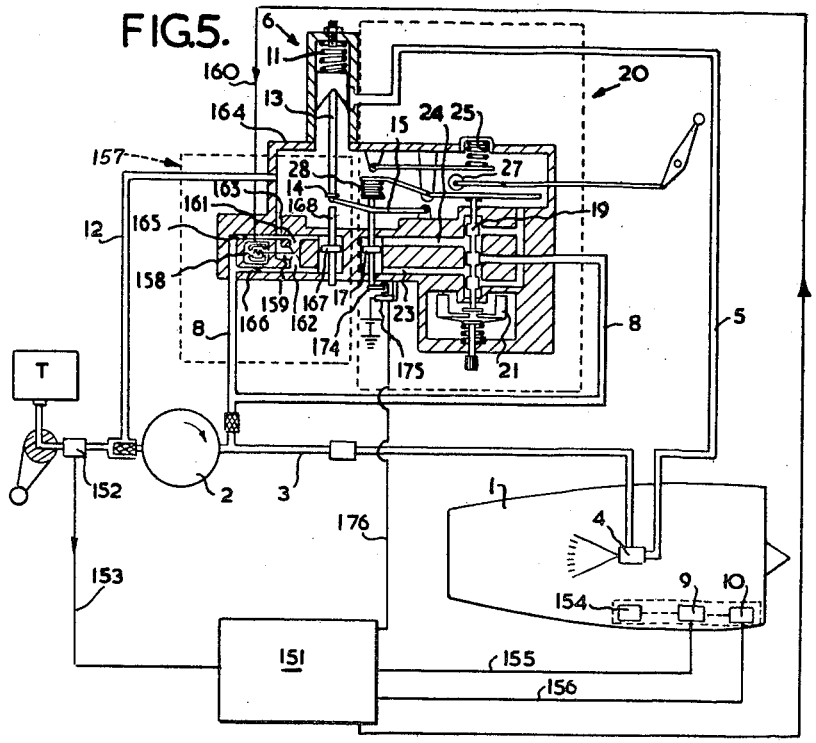

United States Patent Office 3,164,161
Patented Jan. 5, 1965

3,164,161
CONTROLS FOR GAS TURBINE ENGINES OR
OTHER APPARATUS
Stanley R. Tyler, Cheltenham, England, assignor to
Dowty Fuel Systems Limited, Cheltenham, England
Filed Mar. 26, 1962, Ser. No. 182,305
Claims priority, application Great Britain, Mar. 28, 1961,
11,341/61; Oct. 2, 1961, 35,518/61
4 Claims. (Cl. 137—29)

This application relates to fuel-flow control apparatus for engines, for example gas turbine engines in aircraft, of the type which include means for controlling the rate of fuel flow to the engine to maintain the speed of the engine at a variable predetermined value (i.e. an all-speed governor), and means responsive to engine operating conditions for limiting the rate of fuel flow to the engine during an acceleration of the engine (i.e. an acceleration control).

Known acceleration controls are responsive to engine operating conditions which may include any one or more of the following:

Temperature and/or pressure of gas entering the engine, compressor pressure at one or more stages of the compressor, temperature of gas entering or leaving the turbine, and engine speed. These known acceleration controls schedule the rate of fuel flow to the engine during its acceleration as some function of one or more of these conditions, this function being chosen that, as engine speed increases, the rate of fuel flow follows the stall or surge curve of the engine as closely as possible to give the best possible acceleration without causing the engine to stall or surge.

However, there are other fcaotrs which affect the maximum rate of fuel flow which can be supplied to such an engine during its acceleration without causing stall or surge. For example, the temperature and hence the density of the fuel may vary, thus altering the calorific value of a given volume of fuel. Also, the calorific value of a new supply of fuel may be slightly different from that of the previous supply. Further, it is well known that engines "age," in that as their life goes on they gradually require greater amounts of fuel to maintain the engine speed at a given value and to accelerate the engine. Even engines of identical construction and age require different rates of fuel flow to give the same speed or acceleration.

Thus known acceleration controls, which do not take these other factors into account, have to be designed to allow for any possible variation in these factors by scheduling the rate of fuel flow during acceleration an adequate amount below the stall or surge curve, with the result that the acceleration allowed by the acceleration control is not as good as it could be under given engine operating conditions.

It is an object of this invention to provide a fuel flow control apparatus for such an engine which takes these other factors into account and schedules acceleration fuel flow accordingly.

According to this invention, therefore, the apparatus includes adjusting means responsive to the rate of fuel flow required to maintain the engine at a predetermined speed and arranged to adjust the acceleration control accordingly. While the engine is running at a steady speed, the adjusting means compares the rate of fuel flow required to maintain the engine at that speed with the rate of fuel flow which the acceleration control would allow if the engine was accelerated and, if these depart from some predetermined relation, adjusts the acceleration control accordingly.

This adjustment may be made in either one of two ways, additive or multiplying. In an additive adjustment, the acceleration control is adjusted by raising or lowering a datum (that is adding to or subtracting from the datum) in the acceleration control. In a multiplying adjustment, a multiplying factor in the acceleration control is adjusted. This specification describes four embodiments of the invention, shown in FIGURES 2, 3, 6 and 7 respectively. The embodiment shown in FIGURE 2 has an additive adjustment while the other three embodiments have multiplying adjustments.

Figure 6:
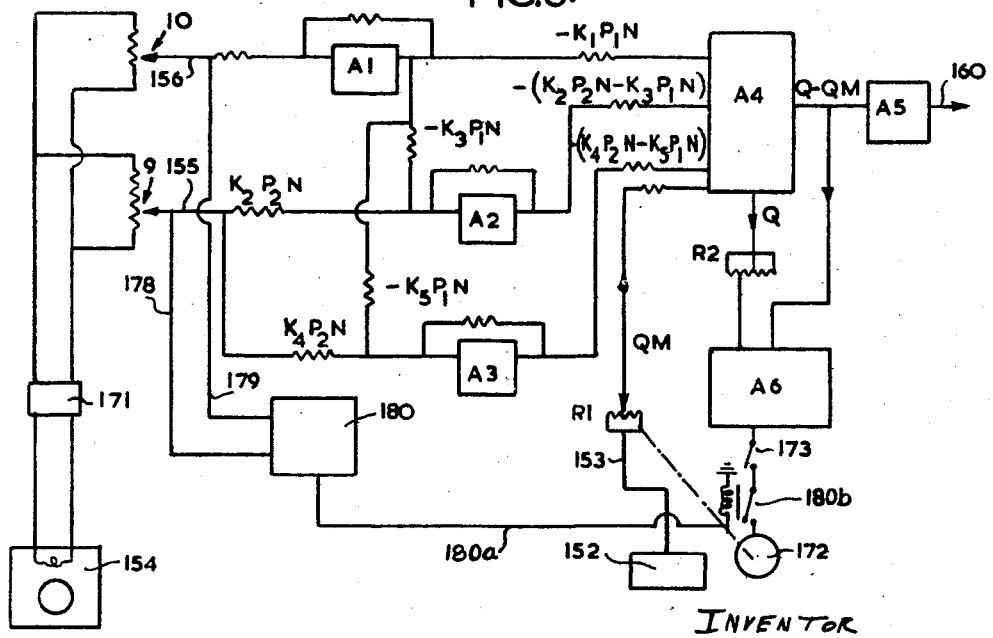
Figure 2:
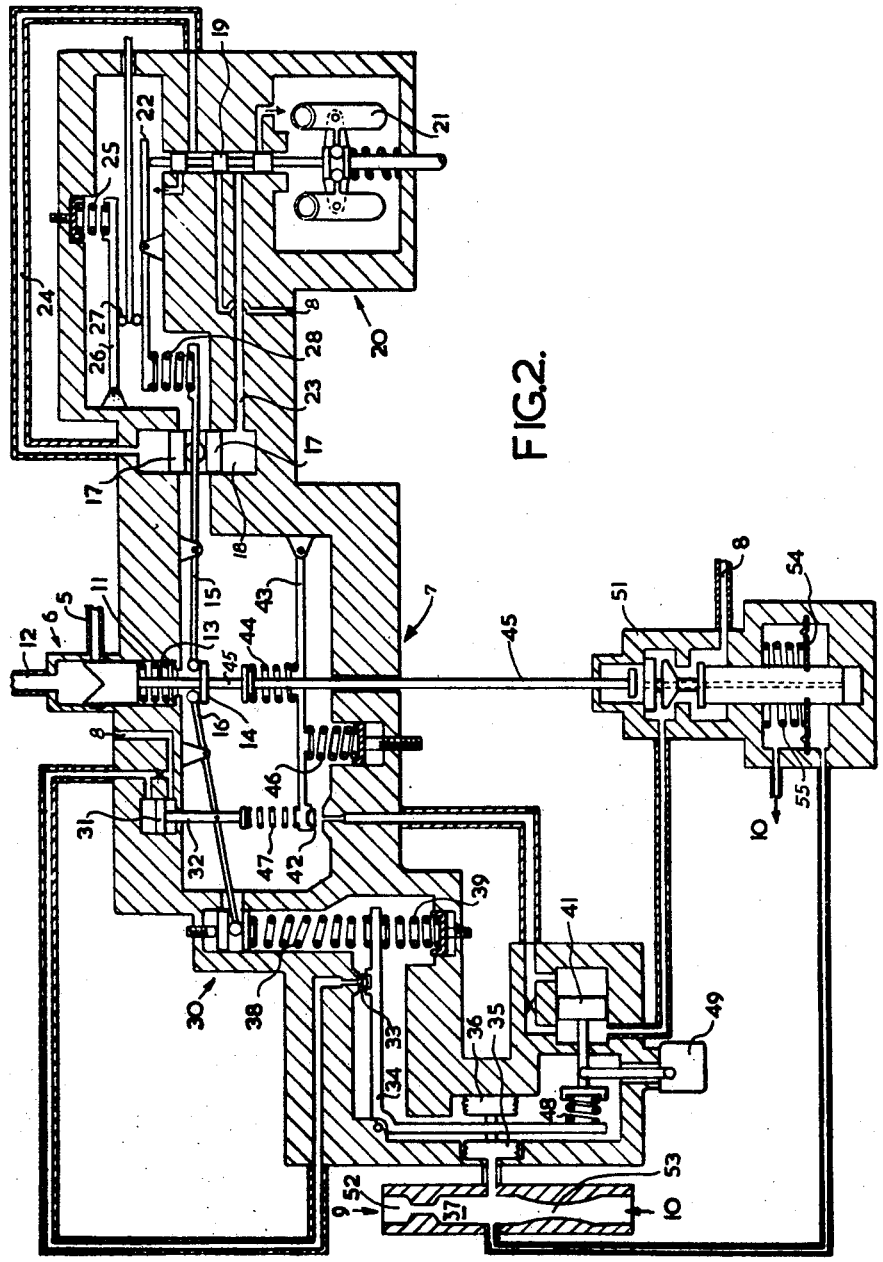
Figure 7:
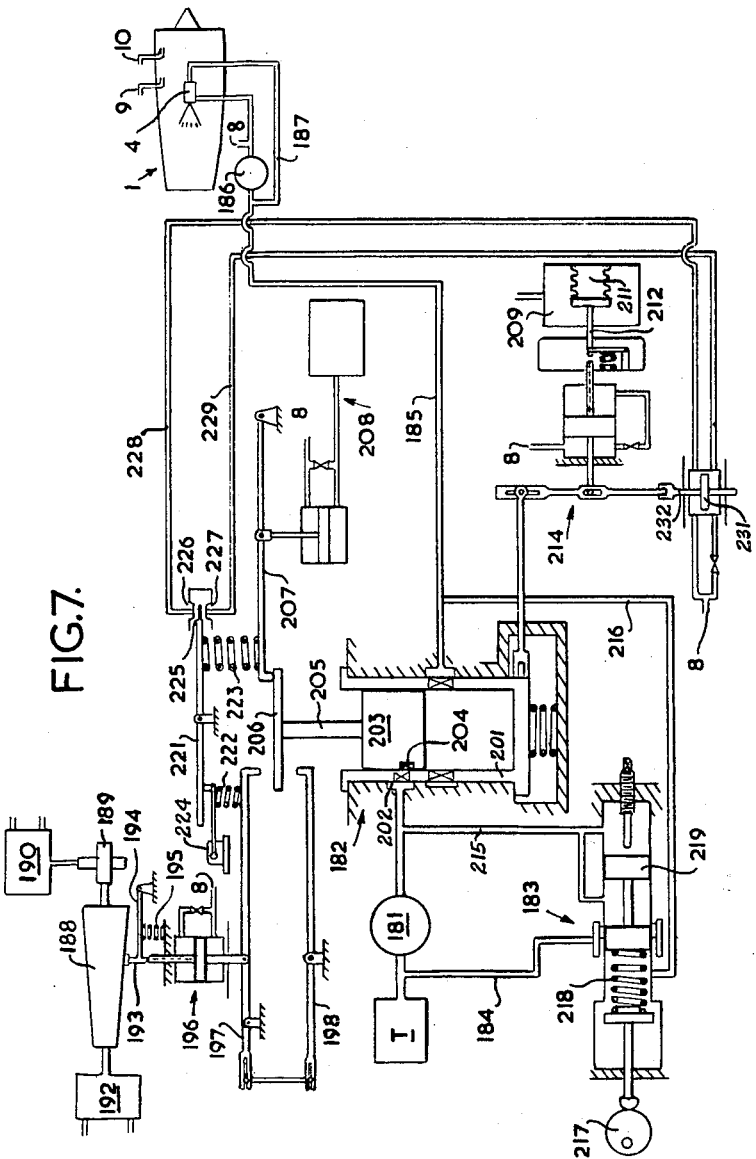

Embodiments of the present invention will now be described, by way of example, with reference to the accompanying drawings of which, FIG. 1 is a diagram showing the principle of a single circuit fuel system for a gas turbine engine, FIG. 2 is a diagrammatic view of a fuel flow control for the system shown in FIG. 1 according to one embodiment of the invention, FIG. 3 is a similar view of a fuel flow control for the system shown in FIG. 1 according to a second embodiment of the invention, FIG. 4 is a sectional view along the line IV—IV of FIG. 3, FIG. 5 is a diagram showing a single circuit fuel system including an electrically operated acceleration fuel flow control, FIG. 6 is an electrical circuit diagram of an electrically operated acceleration fuel flow control for the system shown in FIG. 5 and forming part of a fuel flow control according to a third embodiment of the invention and, FIG. 7 is a diagrammatic view of a two circuit fuel system including a fuel flow control according to a fourth embodiment of the invention.

With reference to the accompanying drawings, FIGS. 1 and 2 show a single circuit fuel system for an aircraft gas turbine engine 1.

Liquid fuel from tank T is pumped by a positive displacement pump 2 along a supply line 3 to the spill burners 4 of the engine 1. Spill fuel from the burners 4 passes along a spill line 5 to a spill valve 6 and thence through a line 12 to the inlet side of the pump 2. The flow of fuel to the burners 4 is controlled by the setting of the spill valve 6 which is controlled by a spill valve controller 7. The spill valve controller 7 includes servo mechanisms operated by high pressure fuel supplied along line 8 and is dependent on the engine compressor delivery pressure sensed by a device 9 in the engine 1 and also on another pressure sensed by a device 10. This other pressure may be engine compressor inlet pressure or the pressure in the nacelle surrounding the engine.

The spill valve 6 is loaded by a spring 11 to a closed position to tend to prevent flow from the line 5 to the line 12. Closing of the valve 6 will cause maximum output from the burners 4 and opening of the valve 6 will reduce output from the burners 4 by permitting a greater spill return flow through the line 5. A stem 13 extending from the valve 6 carries a disc 14 which the ends of a pair of levers 15 and 16 may engage. These levers 15 and 16 form part of the spill valve controller 7. Lever 15 forms part of a known type of closed loop all-speed governor 20, and is servo-controlled by means of a pair of opposed servo pistons 17 operating in a cylinder 18. The pistons 17 are controlled as to their position by a spool valve 19 whose position is adjusted by flyweights 21 driven by the engine 1 and opposed by a spring loading from a lever 22.

The force exerted by the flyweights 21 provides an engine speed signal and thus the all-speed governor 20 is dependent upon actual engine speed and is therefore a closed loop governor.

The positioning of spool valve 19 either blocks a supply of servo fuel through line 8 or directs servo fuel to one or other of the servo pistons 17 through line 23 or line 24.

The spring loading on lever 22 is provided by a spring 25 acting on a lever 26, a movable fulcrum 27 being provided between the two levers 26 and 22 so that the position of fulcrum 27 determines the spring loading acting on the spool valve 19 and thus the engine speed at which a position of balance of spool valve 19 is obtained. A rate spring 28 acting between levers 15 and 22 feeds back movement of servo pistons 17 to the lever 22 to provide the necessary feedback to the governor 20.

The lever 16, which acts upon the disc 14 in addition to the lever 15, forms part of an acceleration control 30 and is controlled by a servo piston 31 having a piston rod 32 pivotally connected to lever 16. Servo piston 31 is controlled on the servo vent principle by a servo vent valve 33, and in turn this vent valve is controlled by a bell crank lever 34. The lever 34 is acted upon by a pair of bellows 35 and 36 of which bellows 35 is fed with the gas pressure from a venturi unit 37. The venturi unit 37 is connected to devices 9 and 10, previously mentioned, in the engine 1, and its action is to produce a predetermined function of operational gas pressures within the gas turbine engine 1. Bellows 36 is evacuated so that bellows 35 exerts force on lever 34 proportional to the gas pressure which it receives. A pair of opposed springs 38 and 39 also act on lever 34, spring 39 being for adjustment purposes whilst spring 38 forms a feed-back between lever 16 and lever 34 so that movement of lever 16 may be substantially proportional to the pressure exerted in the bellows 35.

The acceleration control 30 thus estimates the amount of fuel allowable for an acceleration and is not dependent upon an actual acceleration signal.

During steady running, the lever 15 of the all-speed governor 20 engages the disc 14 to control the setting of value 6 to maintain a constant speed of operation of the engine 1. If an acceleration is selected by moving the fulcrum 27 to the right so as to increase the loading on spool valve 19 the lever 15 will move to allow valve 6 to close. However, closure of the valve 6 will be limited by its engagement with the acceleration control lever 16 which will limit fuel flow to the engine to the maximum value permissible to give acceleration without stall. When the new speed is attained the lever 15 will prevent further closing movement of valve 6.

The all-speed governor 20 represents a closed loop control system whilst the acceleration control 30 represents an open loop control system. The acceleration control 30 is thus inherently subject to errors, and in order to tend to reduce such errors corrective mechanism including an auxilary closed loop servo control is provided between the valve 6 and the acceleration control 30. This auxiliary servo comprises a servo piston 41 operated on the servo vent principle and controlled by a servo vent valve 42. Valve 42 is carried by a lever 43 on which a spring 44 is loaded in the vent closing sense by an extension 45 from the control rod 13 of valve 6. Spring 44 is opposed by a pre-set spring 46. A feed-back spring 47 extends from the servo piston 31 to act also in the vent closing sense on the valve 42. The servo piston 41 acts through a spring 48 onto the bell crank lever 34, a damper 49 of any known kind being provided to give a slow response to the operation of the servo piston 41. Any alternative means may be provided to give an equivalent damping effect such, for example, as a restrictor in the high pressure supply acting on the servo piston 41.

When the engine 1 is controlled by the all-speed governor 20 the servo vent valve 42 controls the servo piston 41 to a position at which the sum of the effective moments of springs 47 and 44 is equal to the moment of spring 46 acting on lever 43. During slow change of operating conditions the all-speed governor 20 will control the valve 6 to maintain the desired speed and due to a variation of the signal received in the venturi unit 37 the acceleration control 30 will normally alter the position of the lever 16 so that it is spaced a constant distance from the disc 14 during steady running of the engine.

An example of one operating condition which the acceleration control 30 cannot take into account is alteration in temperature of the fuel. If, for example, the temperature of the fuel increases, its density will accordingly decrease and for a given setting of the valve 6 such decrease in density will result in a reduced flow of fuel to the engine. This is normally compensated by the action of the all-speed governor 20, and if fuel temperature increases the all-speed governor 20 will cause the valve 6 to close slightly to increase the volumetric delivery of fuel to the engine 1. Since the acceleration control 30 does not respond to change of fuel temperature the lever 16 normally would not move, with the result that if an acceleration is selected the movement of the valve 6 will be less than it might be and accordingly the engine will accelerate at a lower rate than that at which it could accelerate.

When the all-speed governor 20 adjusts valve 6 to compensate for increased fuel temperature the load will in part be removed from the spring 44 to cause a slight increase in opening of the servo vent 42. This in turn will cause movement of the servo piston 41 to the right to reduce the loading of spring 48 which will tend to close the servo vent 33 and cause downward movement of the servo piston 31 to increase the loading of spring 47 to an extent to compensate for the loss in loading of spring 44 so as to restore servo vent 42 to its steady state position. The downward movement of servo piston 31 causes upward movement of the end of lever 16 away from the disc 14 to tend to retain a constant spacing from the disc 14. The damper 49 ensures that this action can take place only at a slow rate, that is a rate slower than the time taken for the engine to accelerate.

When an increase in speed is selected by moving fulcrum 27, the valve 6 will close to the extent determined by the lever 16 and engine acceleration will occur. It is arranged that the duration of any engine acceleration is less than the response time of the damper 49 so that during any such acceleration the loading of spring 48 will remain substantially constant and the acceleration flow characteristics will remain dependent upon the steady state condition immediately prior to acceleration. When the acceleration is completed the all-speed governor 20 again takes control and owing to the fact that acceleration is necessarily of short duration, the servo piston 41 will still be substantially accurately in position, having regard to the operating conditions. Any slight inaccuracy in positioning of the lever 43 will start to correct itself automatically immediately the all-speed governor 20 settles down to steady state operation.

Whilst in FIGURE 2 an auxiliary servo piston 41 has been provided, this can be omitted provided there is a mechanical connection so that springs 44 and 47 may effectively act on the lever 34, a damper being provided to ensure that variations in loading of spring 48 can take place only at a slow rate.

This arrangement will therefore reduce any errors in the acceleration control 30 which, for example result from variation in fuel density as previously mentioned. In effect, the spring 48 provides an accurate datum point from which the acceleration control may operate.

The acceleration control 30 is thus adapted when various operating conditions change so that during an acceleration it will allow the fuel flow to bear a predetermined relation to the fuel flow during an immediately preceding steady running period. Since the acceleration control 30 is adapted by means of the spring 48 which raises or lowers the datum point, this adaptive control may be called additive, as opposed to multiplying.

Under certain conditions it may be desirable to render the adaptive control inoperative. For example, the selection of an idling speed may, under certain flight conditions, cause the spill valve 6 to be opened to a limiting stop to determine a low rate of flow of fuel to the engine and this flow rate will not be controlled by the all-speed governor 20. If the engine is left in this idling condition for any length of time the datum setting (that is the spring 48) of the acceleration control 30 will become incorrectly adjusted. To prevent this occurrence, the movement of spill valve 6 to a minimum engine fuel flow position operates another valve which immobilises either the piston 41 or the mechanical damper 49 to prevent alteration of adjustment of the spring 48. As shown in FIG. 2 a valve 51 is actuated by extension 45 to cut off the supply of high pressure servo fuel through the line 8 to servo piston 41 when the valve 6 moves to a minimum fuel flow condition. Also, the acceleration control 30 does not take into account variations in the ram ratio, which is measured by the ratio of compressor delivery pressure to ambient air pressure. The venturi unit 37 includes a restrictor 52 and a venturi 53, and when venturi 53 is unchoked, that is when air flow through it is subsonic, the pressure in the venturi unit will be the pressure in device 10. The venturi 53 is constructed so that it will unchoke at the point at which it is desired to render the adaptive control inoperative and the venturi unit pressure is fed to one side of a diaphragm 54 and the pressure in device 10 is fed to the other side of the diaphragm 54. When the venturi 53 unchokes, the pressures on opposite sides of the diaphragm become equal and a spring 55 closes the valve 51 to render the servo piston 41 immovable.

FIGS. 3 and 4 show an embodiment of the invention in which the adaptive control of the acceleration control is multiplying rather than additive. The spill valve 6 is moved by means of a rod 61 having formed thereon a pair of flanges 62 for the location of the ball end 63 of a lever 64 of a closed loop all-speed governor whilst at the other end of the rod 61 a further flange 65 is formed for co-operation with a pair of adjustable stops 66 and 67. The lever 64 is pivoted at fulcrum 68 and is moved by means of a piston rod 69 extending from servo piston 71 mounted within servo cylinder 72. The servo cylinder 72 is fed with high pressure fuel from line 8 through pipe 73 and by virtue of a restrictor 74 interconnecting the ends thereof and a servo vent valve 75 the position of the servo piston 71 can be accurately adjusted within the cylinder 72. The servo vent valve 75 forms part of a fly weight assembly 69 including flyweights 76 driven by the engine and a spring 77 whose compression is varied by movement of the pilot's control lever 78. The vent valve 75 opens or closes in accordance with the error between a speed selected by the pilot control lever 78 and the actual speed of the engine as sensed by flyweights 76. The lever 64 will therefore operate on the spill valve 6 to adjust fuel flow to the engine so as to tend to maintain any speed selected by the pilot by operation of the lever 78.

An acceleration control 81 includes the stop 66 which limits movement of the valve 6 when fuel flow is increased for acceleration. The stop 66 is carried by lever 82 which is angularly movable about a pivot 83 and the angular position thereof is adjusted by a piston rod 84 extending from servo piston 85 to a pivotal connection 86 with lever 82. Servo piston 85 is slidably mounted in servo cylinder 87 fed with high pressure fuel from line 8. A restrictor 88 interconnects the ends of the cylinder 87 and a vent valve 89 controls escape flow from the upper end of cylinder 87 thereby to control movement of piston 85. The servo vent valve 89 is controlled by a half ball valve 91 carried on a lever 92 pivoted at fulcrum 93. The controlling signal on lever 92 is given by a pair of opposed bellows 94 and 95 of which bellows 94 is evacuated and belolws 95 is fed with a control pressure derived from the engine through pipe 96. A feedback spring 97 extends between piston rod 84 and the lever 92 so that in a position of equilibrium the loading of spring 97 balances the loading of the bellows 94 and 95. By this means the movement of the piston rod 84 may be made substantially proportional to the force exerted by bellows 95 and 94 so that in effect movement of the piston rod 84 is proportional to the pressure supplied through pipe 96.

Pipe 96 extends to a venturi unit 101 including a pair of chambers 102 and 103 interconnected by an orifice 104 whose effective size is adjusted by means of a tapered rod 105 which forms part of a corrective mechanism. A pipe 106 carries engine compressor delivery pressure to the chamber 102 via line 9 and from the chamber 103 a venturi tube 107 extends via line 10 to a low pressure zone such as the engine nacelle. Air thus flows from chamber 102 to chamber 103 and the pressure in chamber 103 to which pipe 96 is connected will be a proportion of compressor delivery pressure when venturi 107 is choked. At low pressure ratios, the pressure in chamber 103 will become substantially equal to the nacelle pressure, thus making variation in the position of rod 105 ineffective at low pressure ratios, i.e. prior to choking of venturi 107. This point can be chosen so that the position of rod 105 is ineffective and does not exert an adaptive controlling effect when undesirable ram ratio variations occur. Rod 105 extends through the end of the chamber 102 and terminates in a flange 111 on which a compression spring 112 operates to urge rod 105 to its outermost position relative to the chamber 102. A stop 113 at the opposite end of the chamber 103 forms a limit on inward movement of rod 105 representing the maximum opening of orifice 104. A cage 114 engages the underside of flange 111 and within the cage 114 a compression spring 115 is located with some preloading. From cage 114 extends a control rod 116 from which a pair of spaced transverse pins 117 and 118 project. A pivoted bell crank 119 co-operates with the cage 114 for the purpose of urging the rod 105 to its innermost position against stop 113 during idling control of the engine. In normal circumstances the bell crank 119 does not contact cage 114. The corrective mechanism also includes a compensation lever 121 pivoted at fulcrum 122 and having a forked end 123 for engagement with pin 118. The opposite end of the lever 121 is connected to a mechancial damper 124 whose function is to permit a very limited speed of angular movement of lever 121. One compensation compression spring 125 is located between lever 121 and lever 64 whilst a second compensation compression spring 126 extends between the lever 82 and lever 121. These springs act on the lever 121 to urge it to a position between the levers 82 and 64 which divides the spacing between these latter levers to balance the loading, the position being dependent upon the pre-load and rate of springs 126 and 125.

In operation for constant speed control, the lever 64 will be moved in accordance with the speed error from the selected speed by means of servo piston 71 and will effect movement of spill valve 6 to control fuel flow to the engine accordingly. In effecting constant speed control there may be a slight oscillation of lever 64 but there is negligible movement of lever 121 because of the damper 124. In fact lever 121 responds only to changes in the mean position of lever 64. The damping effect is of such magnitude that movement of lever 121 during an acceleration is also negligible. If an acceleration is selected so that vent 75 is closed, the lever 64 is caused to lift the valve 6 and thus to tend to close the spill flow passage. Such movement is, however, limited by the fact that the flange 65 makes contact with the acceleration stop 66. The servo piston and cylinder 71 and 72 is purposely arranged to be able to exert a smaller force on the rod 61 than the servo piston and cylinder 85 and 87 with the result that when flange 65 makes contact with stop 66 no further movement of rod 61 can take place. Since the stop 66 is positioned by bellows 94 and 95 it will ensure that the fuel flow then permited to the engine is sufficient to permit safe acceleration. When the newly selected higher speed is attained the servo piston 71 will cause the valve 6 to open to a greater extent and will take over control of the valve 6 to maintain the new speed.

During any constant speed operation, the setting of the acceleration stop 66 as determined by servo piston 85 is continuously under adjustment in accordance with the mean position taken up by the lever 64. If, for example, the calorific value of the fuel reduces, it will clearly require that a greater volumetric fuel flow is necessary to maintain engine speed and if this happens the lever 64 will lift slightly in its mean position to close to a certain extent the valve 6. This movement is transmitted through spring 125 to lever 121 which will slowly depress rod 116 through pins 118 due to restraining action of damper 124. This movement will in turn cause tapered rod 105 to move and open the orifice 104 so that a larger pressure is generated in chamber 103 and fed to bellows 95. Such larger pressure will tend to close servo vent 89 which will cause servo piston 85 to descend until the increased force exerted by the bellows 95 is counteracted by the variation in loading of spring 97 and a pre-set adjusting spring 127. Thus the acceleration stop 66 will move upwardly to permit a greater fuel flow on acceleration which will compensate for the loss in calorific value of the fuel. A similar but opposite action takes place if calorific value of the fuel increases. Many other disturbances during operation might occur which would have the effect of slightly altering the necessary fuel flow for constant speed control or acceleration, the effects of which will cause the control to compensate for the disturbances in the described manner.

In the embodiment described with reference to FIGS. 1 and 2 the acceleration control is trimmed by the all-speed governor insofar as its datum is concerned, but the functional operation of the acceleration control is the same. In the embodiment shown in FIGS. 3 and 4 correction of the acceleration control is more accurate in that a computing function to which the acceleration control responds is continuously adjusted by the all-speed governor resulting in a multiplying correction being obtained rather than a simple addition or subtraction to correct the datum. A multiplying type of correction eliminates the need for datum correction and is thus suitable throughout the speed range, thus giving more accurate acceleration control throughout the speed range.

In the idling speed ranges of the engine the pressure signals fed to the venturi unit 101 form unreliable signals on which to base acceleration fuel flow for higher engine speeds and to avoid automatic correction by these signals during idling, provision is made to lock the lever 121 into position in readiness for subsequent acceleration when idling speed is selected. This is effected through the damper 124 which includes a control rod 128 from which a tension spring 129 extends to a lever 131. Lever 131 is normally held in position against a stop 132 and includes a forked end 133 to co-operate with pin 117 on rod 116. On selection of the idling condition of the engine the lever 119 is rotated by a suitable connection from the pilot's control to engage cage 114 and thus to cause tapered rod 105 to engage the stop 113. The same movement will cause pin 117 to engage the forked end 133 of lever 131 thus to tension spring 129 and to lock the damper 124 in position. This will ensure that lever 121 cannot move in spite of the fact that the lever 64 controlled by the all-speed governor moves downwardly to a considerable extent to open the valve 6 and thus reduce fuel flow to the engine to a low value.

On light-up of the engine, there is little danger of overfuelling once the characteristics of the engine have been established. The pilot's lever 134 is therefore arranged to pre-release the lock 128 on damper 124 on shut down. The effect of springs 126 and 125 to force the rod 105 into the open position thereby gives the maximum proportion of a compressor delivery pressure in bellows 95. On light-up, the pressure in passage 96 will be equal to nacelle pressure and therefore light-up flow would be independent of the setting of rod 105. Having started, the engine speed will dwell at idling for the purpose of pre-flight checks during which time the normal adaptive compensation will occur.

Provision is also made in the fuel system shown in FIGS. 3 and 4 to determine minimum fuel flow of the engine under various operating conditions. The minimum fuel flow stop 67 is carried by a lever 135 which is pivoted at fulcrum 83 coaxially with lever 82. The levers 82 and 135 are of channel construction as is seen more clearly in FIG. 4 and the fulcrum 83 is formed by a pair of pivot pins 136 which are spaced apart by a small distance leaving a small clearance centrally of the channels forming the levers 82 and 135. Within this space is located an auxiliary lever 137 having pins 138 and 139 at opposite ends for engagement in slots in the levers 135 and 82 respectively. At its centre, lever 137 is pivoted to a push rod 141 slidably mounted in a guide 142 so as to be movable towards the upper end of rod 116. A pair of adjustable stops 143 and 144 are carried by the lever 82 to limit the relative angular movement between the levers 82 and 135. A spring 145 between the right hand ends of the levers acts to urge the levers relatively in the sense so that the stop 143 determines a relative spacing between the acceleration and the minimum flow stops 66 and 67.

When a deceleration is selected by the aircraft pilot by virtue of selecting a lower speed of the engine, the lever 64 will move downwardly by operation of the servo piston 71 to the extent that flange 65 contacts the minimum flow stop 67. The force then applied by the servo piston 71 will cause lever 135 to be moved angularly about fulcrum 83 until stop 144 engages the lever 135 and further movement of servo piston 71 will tend to move the servo piston 85, which it is unable to do as previously explained. Relative movement between the levers 82 and 135 will cause the left hand pivot 138 carried by lever 135 to move downwardly about the pivot 139 which is substantially fixed by virtue of the fact that lever 82 is substantially fixed. This will cause lowering of the rod 141 to make contact with the upper end of rod 116 to depress the tapered rod 105 by a predetermined amount. This in turn will alter the proportion of delivery pressure developed in pipe 96 which will cause servo piston 85 to move downwardly to a slight extent. As the engine decelerates and compressor delivery pressure alters so the servo piston 85 will move levers 82 and 135, thus lowering the minimum flow stop 67 in accordance with the operational conditions of the engine. It will be noted that after the initial movement of lever 135 relative to lever 82 during selection of deceleration, no further downward movement of the rod 141 will occur. Whenever the engine is being decelerated, the lock 128 on damper 124 is engaged by action of lever 131 in order to prevent reset action so that subsequent acceleration will be in accordance with the previous steady state computation.

FIGS. 5 and 6 concern a single circuit fuel system which includes an electrically operated acceleration fuel flow control. In other respects the arrangement is somewhat similar to the system described with reference to FIGS. 1 and 2 and where possible like reference numerals will be used to indicate like parts.

The acceleration fuel flow control includes a computer 151 which computes how much fuel in excess of that which is actually being supplied to the engine could in fact be supplied without likelihood of causing an engine stall or surge. A flow meter 152 supplies an electrical signal along line 153 to the computer 151 and indicates the actual supply of fuel to the engine, and an engine speed indicator 154 located in the engine supplies a signal of engine speed. This signal is combined with signals of compressor pressures from devices 9 and 10 which pass along lines 155 and 156 to the computer 151.

If the actual flow of the fuel to the engine is $Qm$ and the maximum permissible fuel to the engine is Q, then the computer 151 supplies to the acceleration control means 157 along line 160 a signal which is proportional to Q—Qm. The computer 151 is arranged that such a signal is only supplied to the acceleration control means 157 when Qm is greater than Q, that is to say when the fuel being supplied to the engine actually becomes greater than that permissible.

The acceleration control means 157 includes an electrically controlled servo mechanism 158 which operates to move a flapper 159 which is positioned between two orifices leading from a pair of high pressure servo fuel lines 161 and 162 to a return conduit 163 which leads to the interior of housing 164. Lines 161, 162 are fed with high pressure servo fuel through restrictors 165, 166 respectively from line 8. When the servomechanism 158 receives a signal from the computer 151 the flapper 159 is moved to restrict flow of fuel from the line 162 and the increased pressure in line 162 moves a servo piston 167 upwardly. This servo piston 167 carries a rod 168 which when functioning to limit the supply of fuel to the engine engages the stop 14 on the end of rod 13.

The voltage signal from the engine speed indicator 154 is rectified by a bridge rectifier 171 and this signal is operated upon by devices 9 and 10 which in this case are pressure transducers measuring pressures $P_2$ and $P_1$ respectively. The resulting signals in lines 155 and 156 are proportional $NP_2$ and $NP_1$ respectively where N is engine speed.

The voltage representing $NP_1$ is then fed to a phase reversing amplifier $A_1$ to produce outputs of $—K_1P_1N$, $—K_3P_1N$ and $K_5P_1N$. Summing amplifiers $A_2$, $A_3$, $A_4$ are fed with combinations of the above products and $K_2P_2N$ and $K_4P_2N$ to produce functions $(K_4P_2N–K_5P_1N)$, $(K_2P_2N–K_3P_1N)$ and $K_1P_1N$ to simulate the required curve for Q.

The signal from the flowmeter 152 is converted to a steady voltage which is fed to a potentiometer R1 and the signal Qm from the potentiometer R1 is compared with signal Q to produce a signal Q—Qm. This signal Q—Qm acts through a servo amplifier A5 to control the acceleration control means 157. The amplifier A4 also has an output connection giving a signal of the permissible maximum fuel flow Q at any instant to permit safe acceleration. This output signal Q is fed to a potentiometer R2 from which a predetermined fraction is selected and fed to the input of a subtracting amplifier A6. The amplifier A6 also receives in its input the Q—Qm signal and the operation of the amplifier is to rotate a reversible motor 172 in accordance with the difference of the two signals. The reversible motor 172 is mechanically connected to the potentiometer R1 and this is adjusted to alter the proportion of the signal from the flowmeter 152 fed into amplifier A4. The amplifier A6 and motor 172 form a corrective mechanism.

In normal operation at a constant speed the signal Qm of all-speed governor controlled fuel flow to the engine is fed through potentiometer R1 to the amplifier A4. the proportion of signal Q selected by potentiometer R2 for feeding into the amplifier A6 is selected as the approximate normal relation between steady state fuel flow to the engine and the increase in this fuel flow to obtain safe acceleration. In the present example this fraction is taken as 1/8. Thus, normally the two inputs to the amplifier A6 should be of the same value and since they act in opposition there will be no output to rotate the motor. In the event of error occurring between these two signals the motor will be rotated to adjust potentiometer R1 to alter the proportion of the signal QM fed into the amplifier A4 in order to maintain the amplifier A6 and the motor in a state of balance. The setting of the potentiometer R1 effects an adaptive control of the acceleration control in a multiplying sense. It will be seen that, as before, the acceleration control is an open loop control system and that the all-speed governor is a closed loop control system.

The adaptive control must be rendered inoperative when an acceleration is selected and this is achieved by means of a switch 173 between amplifier A6 and the motor 172. When an acceleration is selected the servo piston 17 controlling the spill valve 6 moves downwardly and its piston rod 174 contacts a switch 175 to complete a circuit through line 176 to the computer 151 and completion of this circuit is arranged to open switch 173. Movement of the spill valve 6 to the minimum flow position also causes the switch 175 to be operated with consequent opening of switch 173 and consequent inoperation of the adaptive control.

The adaptive control is also rendered inoperative when ram ratio variations are likely to have an undesirable effect and for this purpose an electrical divider 180 receives signals along lines 178 and 179 from devices 9 and 10 and measures the ratio of these signals which form an indication of ram ratio. For those valves of the ratio at which it is desired to render the adaptive control inoperative the divider 180 sends a signal along line 180a to open a switch 180b between the motor 172 and amplifier A6.

FIG. 7 shows a fourth embodiment of the invention which is incorporated in a two circuit fuel system. Liquid fuel is pumped from a tank T by a supply pump 181 to a metering valve 182 and a by-pass valve 183. Fuel passing through the by-pass valve 183 returns along line 184 to the inlet side of the supply pump 181. Fuel passing through the metering valve 182 passes along line 185 to a circulating pump 186 and then to spill burners 4. Spill flow from the burners 4 passes along line 187 to the inlet side of the pump 186.

The acceleration control includes a function generator 190 which computes a function of the pressures in devices 9 and 10 and, according to the function, rotates a three-dimentional cam member 188 by means of a rack and pinion 189. The acceleration control is also sensitive to and compensates for variations in ram ratio by means of a function generator 192 which computes a function of ambient air pressure and pressure in the device 10. This function is caused to move the cam member 188 linearly.

A cam follower 193 is carried by a pivoted lever 194 and resiliently urged against cam member 188 by a spring 195. The cam follower 193 controls a servomechanism 196 connected to a pivoted lever 197. The pivoted lever 197 is coupled to another pivoted lever 198 and these levers 197, 198 form the acceleration flow stop and minimum flow stop respectively for the metering valve 182.

The metering valve 182 includes an angularly movable sleeve 201 having a window 202 and a linearly movable sleeve 203 having a window 204. The angular position of sleeve 201 and the linear position of sleeve 203 determine the degree of alignment of windows 202 and 204, thus defining a variable aperture through which fuel travelling to the line 185 has to pass.

The sleeve 203 carries a rod 205 to which is secured a disc 206 located between levers 197 and 198 and, during steady running, acted upon by a lever 207 which forms part of a closed loop all-speed governor 208. The governor 208 is similar to the governor 20 described with reference to FIG. 2.

The angular position of sleeve 201 is controlled in accordance with a function of pressure in the device 10, this pressure being fed to a chamber 209 where it acts upon an evacuated bellows 211. The bellows 211 carries a rod 212 which controls the angular position of sleeve 201.

The pressure drop across metering valve 182 is fed via lines 215 and 216 to the by-pass valve 183 where it is opposed by a force proportional to the square of the engine speed. A cam 217 positioned by this force controls the compression of a spring 218 acting on a sliding piston valve 219 acted upon also by the pressure drop across the metering valve 182. This by-pass valve 183 regulates the flow through lines 215 and 184 to maintain the pressure drop across the metering valve 182 at a value proportional to the square of engine speed. Thus during steady running conditions, fuel flow is controlled by the all-speed governor 208 through lever 207 and during acceleration disc 206 abuts lever 197 so that fuel flow during acceleration is controlled by the position of lever 197, the position of sleeve 201 and the pressure drop across the metering valve 182. In this embodiment, the adaptive or corrective mechanism includes a pivoted comparator beam 221 carrying two springs 222 and 223, which act upon lever 197 and lever 207 respectively.

An adjuster 224 is provided for adjusting the strength of spring 222. Beam 221 also carries a flapper 225 located between two servo-vents 226, 227 connected via two lines 228, 229 to a servo piston 231. Servo piston 231 is carried by a rod 232 connected with the linkage 214.

The springs 222 and 223 are constructed so that when the flapper 225 of the beam 221 is equidistant from the servo-vents 226 and 227 and therefore servo piston 231 is stationary, the position of lever 197 bears a predetermined relation to the position of lever 207 and therefore initial acceleration fuel flow will bear a predetermined relation to the previous steady running fuel flow.

If during steady running this relationship is upset, for example by a change in fuel temperature, then the comparator beam 221 will move and cause the flapper 225 to move nearer one of the servo-vents 226, 227. This causes movement of servo-piston 231 and consequent adjustment of the linkage 214 and therefore adjustment of the angular position of sleeve 201. This will tend to alter the size of the aperture formed by the windows 202, 204 and the consequent tendency for fuel flow and hence engine speed to change will be sensed by the all-speed governor 208 which will move sleeve 203 to restore the size of the aperture to its former value. This adjustment ceases when the correct relationship again exists between lever 197 and lever 207.

In the previous examples, the steady state control has comprised a closed loop speed governor in which engine speed sensing means has controlled fuel flow to the engine to tend to maintain engine speed at a constant value. It is within the scope of the present invention to use as an alternative steady state control an open loop speed governor in which fuel flow to maintain a desired engine speed is computed by a computer from operating conditions of the engine.

The speed at which the engine actually runs will vary from the desired speed as a result of variations of conditions not fed to the computer, for example variations in fuel calorific value, fuel temperature and engine characteristics. To obtain an adapting signal, means are provided to compare actual steady engine speed with the steady engine speed selected by the computer. This may comprise a centrifugal flyweight arrangement driven by the engine and acting to produce a fluid pressure proportional to the square of actual steady engine speed, means operated by the computer to produce a fluid pressure proportional to the square of selected steady engine speed, and a damped piston and cylinder unit to which the pressures are fed to produce a damped piston movement dependent on the difference of the pressures. This piston movement can then be applied as an adapting signal to the acceleration fuel flow control. In this specification, acceleration is an example of a transient operational state of the engine whilst steady running is a steady operational state.

I claim as my invention:

1. Fuel-flow control apparatus for an engine, including means for supplying fuel to the engine, means to control the rate of fuel flow to the engine and operable to maintain the engine at a predetermined speed, said control means being variable to effect positive or negative acceleration, limiting means responsive to engine operating conditions for limiting the rate of fuel flow to the engine during such acceleration, and adjusting means responsive to the rate of fuel flow required to maintain the engine at a predetermined speed arranged to continually adjust said limiting means in proportion to said rate of fuel flow.

2. Fuel-flow control apparatus as in claim 1, wherein said limiting means includes a datum, and the adjusting means includes means to raise or lower the value of the datum in accordance with the average fuel flow rate as controlled by said rate-of-flow control means over a period.

3. Fuel-flow control apparatus as in claim 1, wherein said adjusting means acts to provide a multiplying factor in the operation of the limiting means.

4. Fuel-flow control apparatus as in claim 3, wherein said limiting means includes means responsive to a gas pressure and said means operable to provide a multiplying factor operates by varying said gas pressure.

References Cited by the Examiner

UNITED STATES PATENTS

| | | | |
|---|---|---|---|
| 2,662,372 | 12/53 | Offner | 60—39.28 |
| 2,743,578 | 5/56 | Hazen | 60—39.28 |
| 2,848,869 | 8/58 | Russ | 60—39.28 |
| 2,851,855 | 9/58 | Gamble | 60—39.28 |
| 2,943,447 | 7/60 | Davies | 60—39.28 |
| 2,950,596 | 8/60 | Haase | 60—39.28 |
| 2,971,338 | 2/61 | Bodemuller | 60—39.28 |
| 3,035,795 | 5/62 | Larson | 244—77 |
| 3,076,312 | 2/63 | Haigh | 60—39.28 |
| 3,077,557 | 2/63 | Joline | 244—77 |
| 3,078,669 | 2/63 | Williams | 60—39.28 |
| 3,092,167 | 6/63 | Brown | 60—39.28 |

FOREIGN PATENTS

| | | |
|---|---|---|
| 1,266,684 | 6/61 | France. |
| 845,269 | 8/60 | Great Britain. |

SAMUEL LEVINE, *Primary Examiner.*

ABRAM BLUM, *Examiner.*